United States Patent
Lang et al.

(10) Patent No.: US 6,467,917 B1
(45) Date of Patent: Oct. 22, 2002

(54) STIFFENED EXTERNAL REARVIEW MIRROR ASSEMBLY

(75) Inventors: Heinrich Lang; Wolfgang Seiboth; Stefan Centmeyer, all of Ergersheim (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/652,354

(22) Filed: Aug. 29, 2000

(30) Foreign Application Priority Data

May 4, 2000 (DE) .......................................... 100 21 743

(51) Int. Cl.⁷ .............................................. G02B 7/182
(52) U.S. Cl. ...................... 359/871; 359/872; 359/855; 359/865; 359/838
(58) Field of Search ................................ 359/871, 872, 359/855, 865, 838, 850, 876, 883; 248/479, 481, 483

(56) References Cited

U.S. PATENT DOCUMENTS

| | | | |
|---|---|---|---|
| 3,448,553 A | * 6/1969 | Herr et al. ................... | 359/883 |
| 3,644,022 A | 2/1972 | Jagdt et al. | |
| 4,162,341 A | * 7/1979 | Norton ........................ | 428/117 |
| 4,423,869 A | * 1/1984 | Haines ......................... | 273/73 |
| 4,701,037 A | 10/1987 | Bramer | |
| 4,875,766 A | * 10/1989 | Shimodaira et al. ......... | 359/871 |
| 5,031,871 A | 7/1991 | Ohta et al. | |
| 5,621,577 A | 4/1997 | Lang et al. | |
| 6,206,553 B1 | * 3/2001 | Boddy et al. ................ | 362/494 |

FOREIGN PATENT DOCUMENTS

| | | |
|---|---|---|
| DE | A4010083 | 10/1991 |
| DE | 0590510 B1 | 4/1997 |
| DE | 0865967 A2 | 9/1998 |

OTHER PUBLICATIONS

USSN 08/804,205, filed Feb. 21, 1997.
USSN 09/266,987, filed Mar. 12, 1999, CPA filed Nov. 6, 2000.

\* cited by examiner

*Primary Examiner*—Mohammad Sikder
(74) *Attorney, Agent, or Firm*—Dority & Manning, P.A.

(57) ABSTRACT

A rearview mirror supporting assembly is provided for use on a vehicle. A carrier for the rearview mirror supporting assembly contains a stiffening frame. The carrier is configured to receive a foam element internally to encapsulate and further stiffen the frame. The carrier is attached to the vehicle and a mirror may be affixed to the carrier.

26 Claims, 8 Drawing Sheets

STIFFENED EXTERNAL REARVIEW MIRROR ASSEMBLY

The invention concerns a rear view mirror arrangement, especially an outside mirror for commercial vehicles in accord with the generic concept of claim 1.

Outside mirrors of this kind and of variously different constructions are already known in the present state of the technology. A mirror pane is adjustably affixed by a pivoting mechanism to a housing part, which part is appropriately connected to the body of the vehicle, allowing the mirror to swing in reference to the said housing part. The housing part is, as a rule, a solid plastic part, produced by injection molding. It is generally of a basin-like construction in which further mirror components or corresponding connection points for additions are installed. In particular, for large truck and bus mirrors, the carrying structure for outside mirrors is based on tubing or plates, which are affixed directly to the mirror holder which projects toward the vehicle body. This construction is disclosed by EP-A-0 590 510. The housing part serves, then as a covering of the back side of the mirror plate and supports the said pivoting mechanism. The said housing also provides a streamlined sheathing for the outside mirror. Such construction is extremely expensive and heavy.

A problem with this tube and plate construction is found in that relatively strong vibrations occur in the said rearview mirror assembly during the operation of the vehicle. In order to reduce these vibrations, EP 0 865 967 A2 proposes a carrying tube structure, encased in a foamed molded part. Again, the disadvantage of this arrangement is, that the entire carrying structure is of excess weight.

A very light design, which is adaptable to smaller mirrors, is taught by DE 44 29 604 A1. In this case, the tube construction is fully dispensed with and the foam element itself remains as the support structure. For this purpose, a gradiated foam is employed as a one-piece element or composes several parts.

Thus, the purpose of the invention is, with EP 0 865 967 A2 as a basis, to make available a sufficiently stable rear vision mirror arrangement, which still exhibits the least possible tendency toward vibration.

The achievement of this purpose is accomplished by the features of claim 1.

Because, the carrier comprises a foam element, in particular the foam being a gradient-foam, in which a branched, stiffening framing is embedded, there is achieved, first, an excellent stability and second, a very small tendency toward vibration. Moreover, such a framing is lighter than the conventional structures with tubular and/or plate carriers. The branched stiffening framing would be insufficient as a carrier by itself. However, in combination with the foam component, the necessary stability is reached. Because of the branched stiffening framing, a large surface is presented on which the foam can find purchase. By this means, a carrier is brought into being, which has a stable, coherent framing of stiffening means and a surrounding foam component.

By the preferred use of a gradient foam, this leads to a design of a large surfaced, rigid layer of skin on the outside of the gradiated foam. In this arrangement, so to speak, are three areas of different rigidity, bonded together in a nearly continuous manner. These are:

the hard stiffening framing itself,
the rigid skin of the gradient foam which adheres directly to the branching of the stiffening framing, and
the actual foam mass which is encapsulated by the skin.

Advantageously, the branched stiffening framing is completely encapsulated within the gradient foam, that is the foam component may be considered a one-piece design. This provides an especially durable connection between the foam component and the branched stiffening framing.

In the case of complicated structuring, it can be of value to embed the branched stiffening framing in two or more shells of foam, especially gradient foam.

Advantageously, the branched arrangement comprises a compartmentalized framing which is composed of standard structural shapes. As an alternative, even a honeycomb design is possible as a carrying framing. Another like possibility is the use of support by a perforated plate arrangement. The essential point of this stiffening framing lies in that a large inner or outer surface is provided, wherein, respectively, the foam component can penetrate and attach itself, to the extent that an adequate holding power and stability is achieved. This goal can also be enhanced, if the outer surface of the stiffening framing is roughed or exhibits protruding tabs.

In accord with an advantageous embodiment of the invention, the carrier encompasses a basin shaped recess, in which the mirror and, if necessary, the accompanying pivotable mechanisms are embedded. Additionally, on the carrier, and also especially on the stiffening framing, fastening point for the various mirrors are provided.

Following another advantageous embodiment, in the foam component, a pre-installed fitting is incorporated. By means of this fitting, the rearview mirror can be fastened to the vehicle. This said fitting, again, is directly and advantageously affixed mechanically with the stiffening framing.

In accord with an additional preferred embodiment, the said fitting includes also the linkage for the swing of the outside mirror, i.e. the pivoting adjustment of the mirror. Alternatively, the carrier can be of two parts, whereby the said two parts are bound to one another by a linkage. Both parts of the carrier are then constructed of a branched stiffening framing and an encompassing foam component.

The remaining subordinate claims concern themselves with firther advantageous designing of the invention.

Further details, features and advantages of the invention are shown in the following description of favorable embodiment examples using the drawing. There is shown in:

FIG. 2 a detailed presentation of the stiffening framing of the embodiment according to FIG. 1, FIG. 3 a view of the stiffening framing with the mirror mounted thereon and the fitting as seen from above, FIG. 4 a sectional view of the fitting of the first embodiment, FIG. 5 A second embodiment of the invention with linkage, fitting and with mirror mounted on the stiffening element, FIG. 6 the second embodiment in accord with FIG. 5, seen from above, FIG. 7 the fitting of the second embodiment, FIG. 8 a third embodiment of the invention with a honeycomb arrangement as a branched framing, and FIG. 9 the honeycomb framing of FIG. 8 embedded within two half shells of gradient foam.

Figure 1:
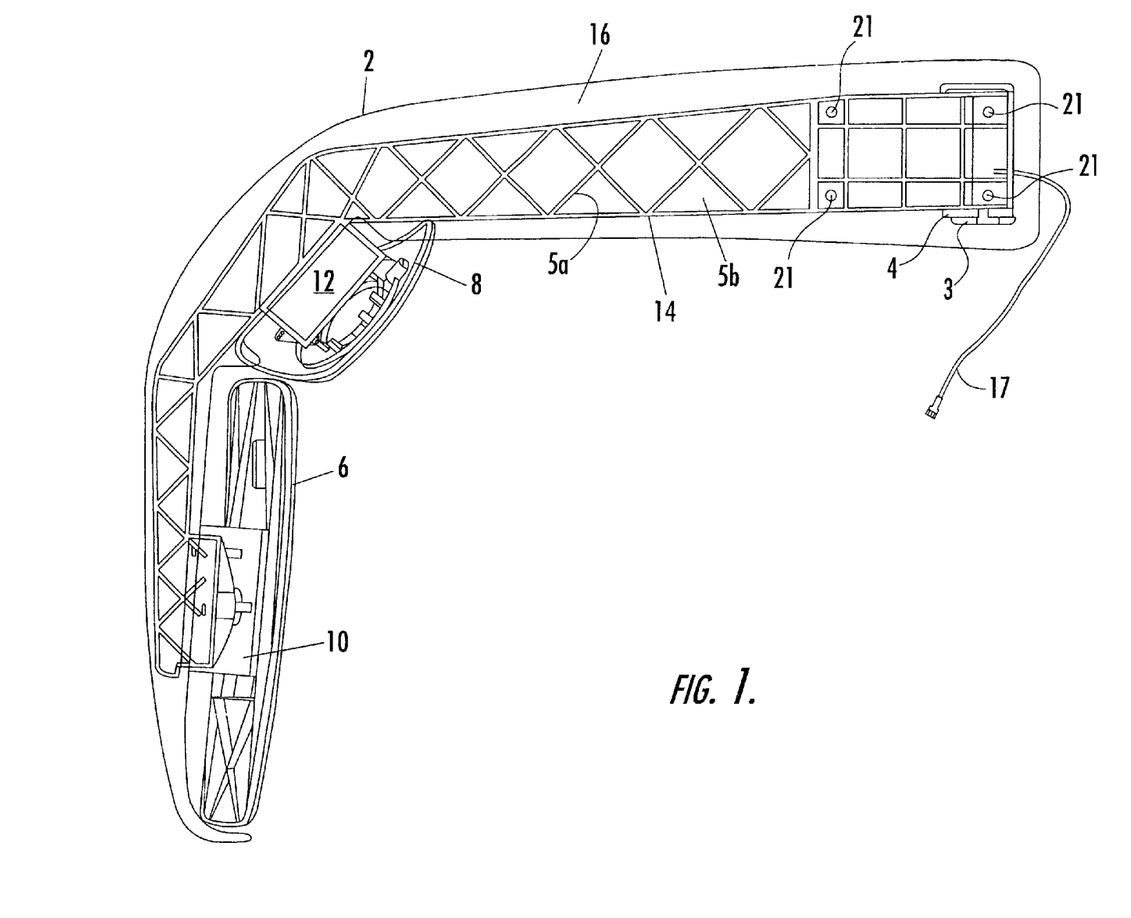
FIG. 1 a schematic presentation of a first embodiment of the invention.

FIG. 1 shows, schematically, a first embodiment of the invention. The rearview mirror arrangement comprises a carrier 2, which, on the vehicle side incorporates a fitting 4. On the end remote from the vehicle of the carrier 2, is mounted a first mirror 6 and a second mirror 8. Both mirrors 6 and 8 are governed by individual adjustment mechanisms, respectively 10 and 12, by means of which they are mounted on the carrier 2. The carrier 2 possesses a branched stiffening structure in the form of a compartmentalized inner framing 14, which is embedded in a foamed component 16 of gradient foam. The reference number 17 delineates the electrical connections, which are also embedded in the said gradient foam 16. As an alternative, the said gradient foam 16 and the compartmentalized framing 14 can be provided with openings (not shown) into which the electrical connection may be led.

Figure 2:
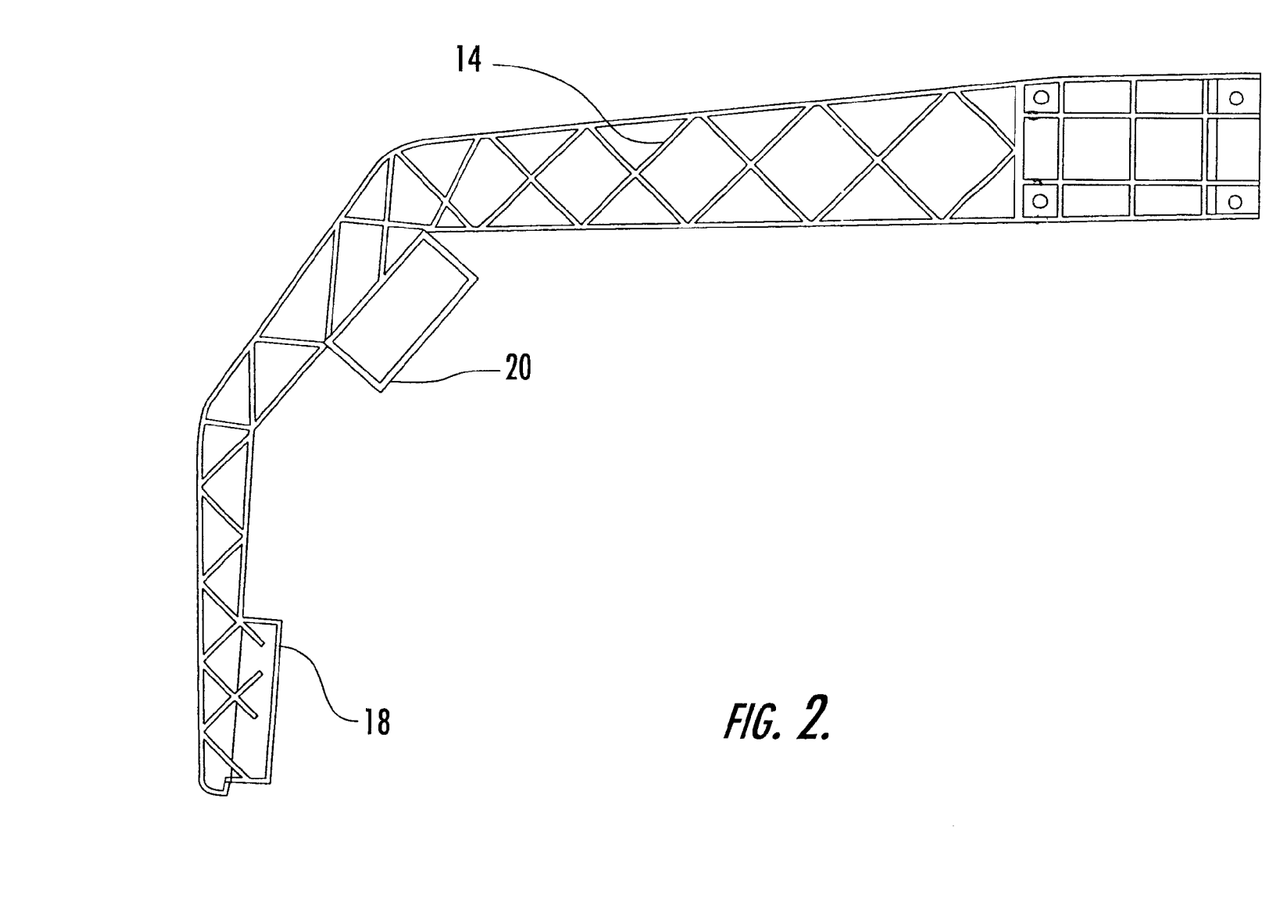

FIG. 2 presents a detail drawing of the compartmentalized framing 14 with the first and second retainers 18 and 20, respectively for the first and second mirrors 6 and 8. As may be inferred from FIG. 2, the fitting 4 is caused to be mechanically affixed with the said stiffening structure, i.e. the compartmentalized framing 14. In more detail, it may be attached by screws thereon. The entire arrangement in accord with FIG. 2 comprises a compartmentalized framing 14 with the fitting 4, both encapsulated within a surrounding of gradient foam 16, and forms, in this way, the invented, connected carrier 2.

Figure 3:
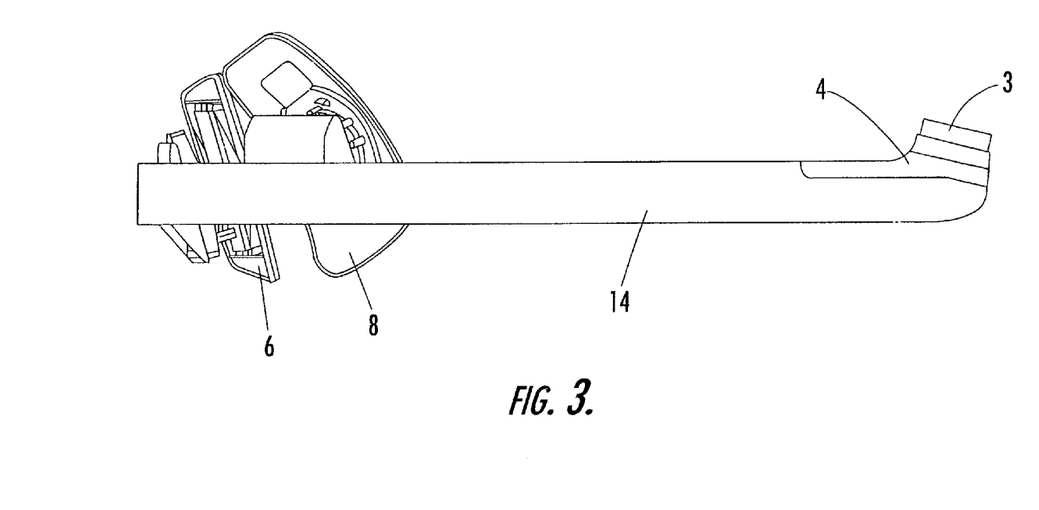

FIG. 3 shows a presentation of the first embodiment as seen from above, without the foamed component 16. FIG. 2 exhibits, that the fixture 4 is screwed onto the said compartmentalized framing 14.

Figure 4:
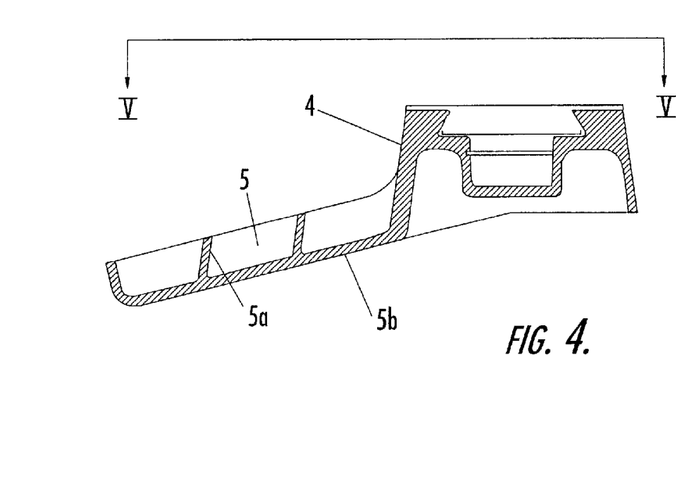

FIG. 4 provides a cross-sectional presentation of the fixture 4, from which may be seen, that the fixture 4 possesses a similar structure to the compartmentalized framing 14, so that it binds itself firmly to the gradient foam 16, i.e., with the foam component 16.

Figure 5:
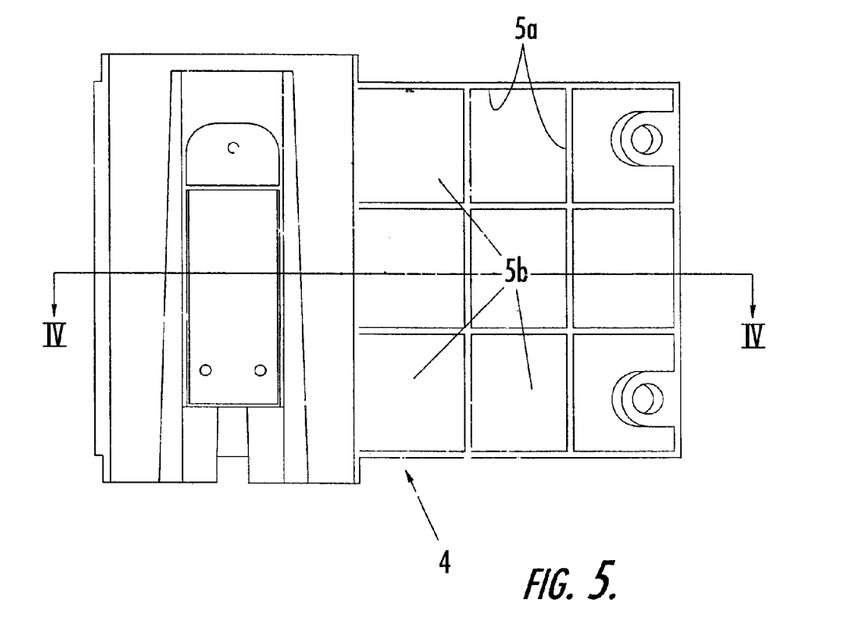
Figure 6:
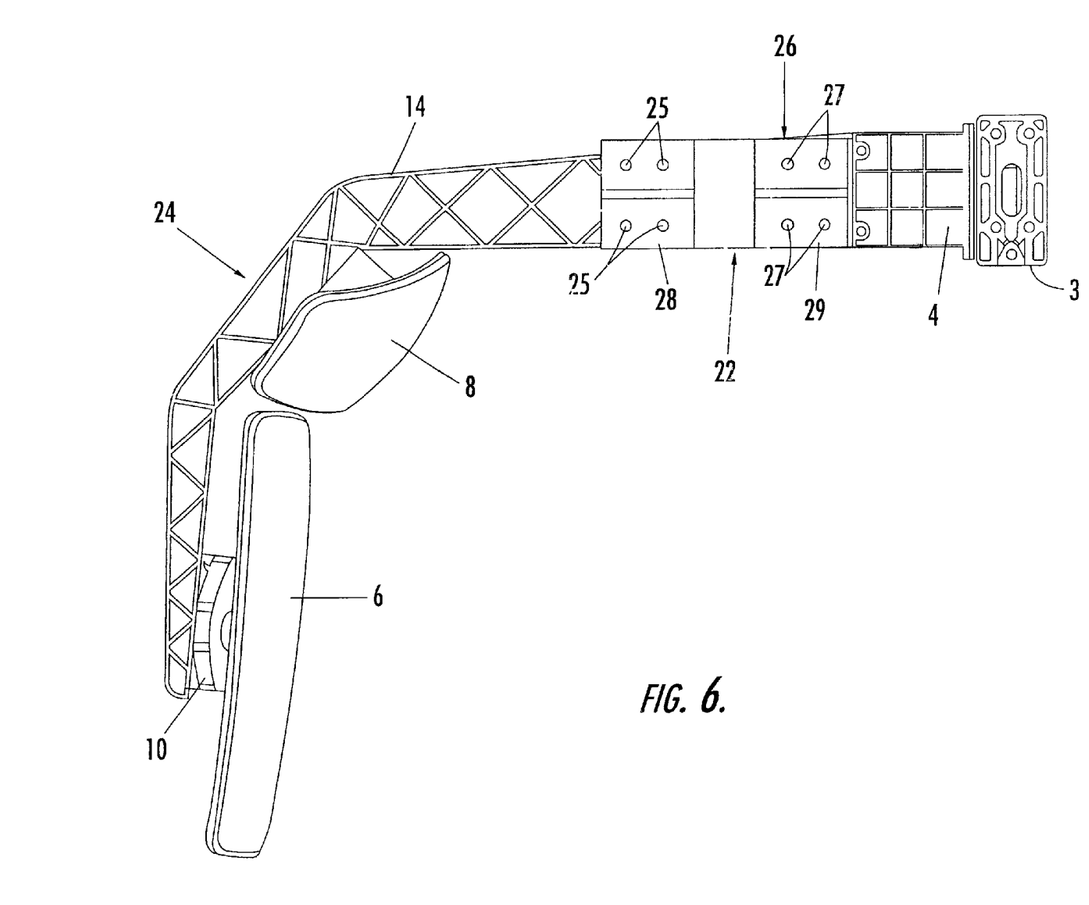
Figure 7:
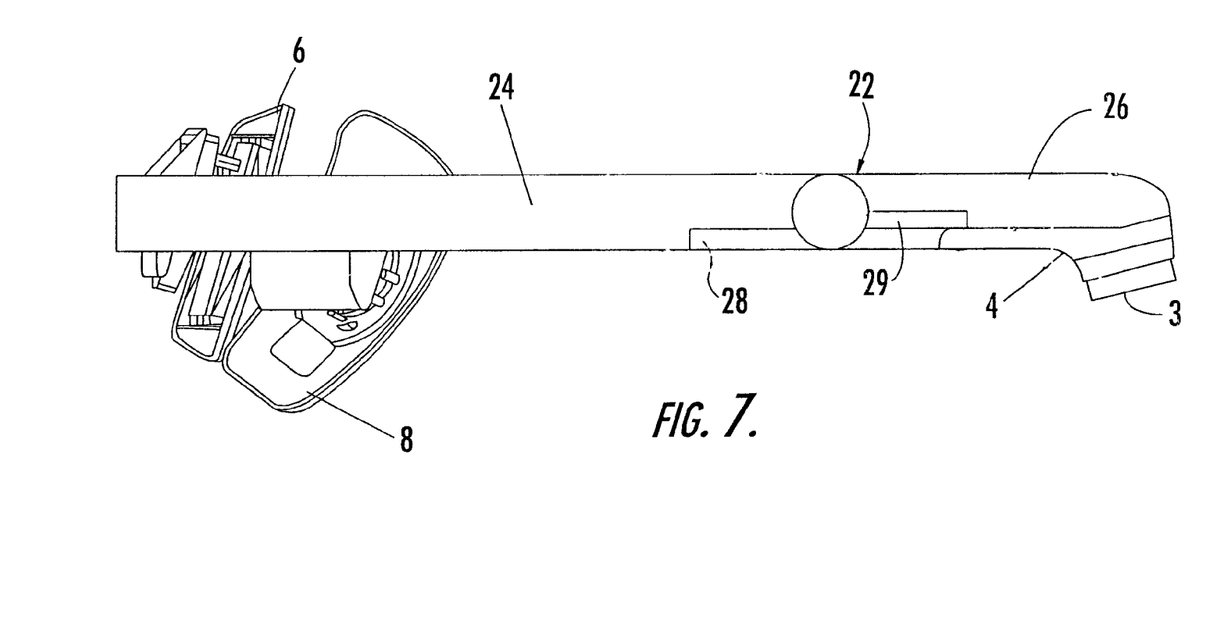

FIGS. 5 to 7 show a second embodiment of the invention, which differs from the embodiment shown in FIG. 1 to FIG. 4, in that in the carrier 2 a pivoting linkage 22 has been integrated, by means of which the mirror arrangement can be adjusted, i.e. swung away. That is, the carrier 2 incorporates a first carrier arm 24 and a second carrier arm 26 which are joined by means of the said linkage 22. The compartmentalized framing 14 of the first carrier arm 24 is affixed by screws to a first linkage part 28, which, together with a linkage part 29 forms the pivoting connection 22. The fixture 4 is screwed onto the second linkage part 26, by means of which the entire rearview mirror can be fastened onto the vehicle body. The second linkage part 29 and the fixture 4 form, in the second embodiment, the second carrier arm 26. As an alternative, the second carrier arm 26, likewise exhibits a compartmentalized framing 14, which is placed between the second linkage part 29 and the fitting 4.

Figure 8:
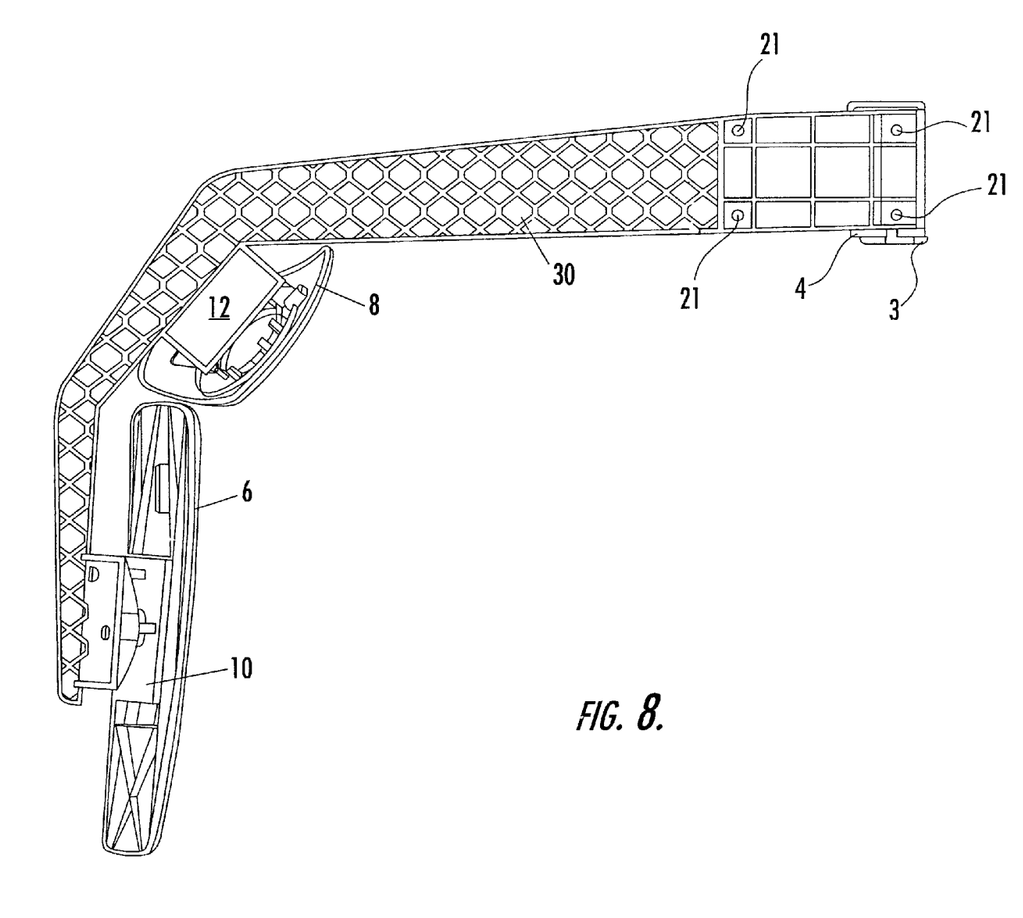
Figure 9:
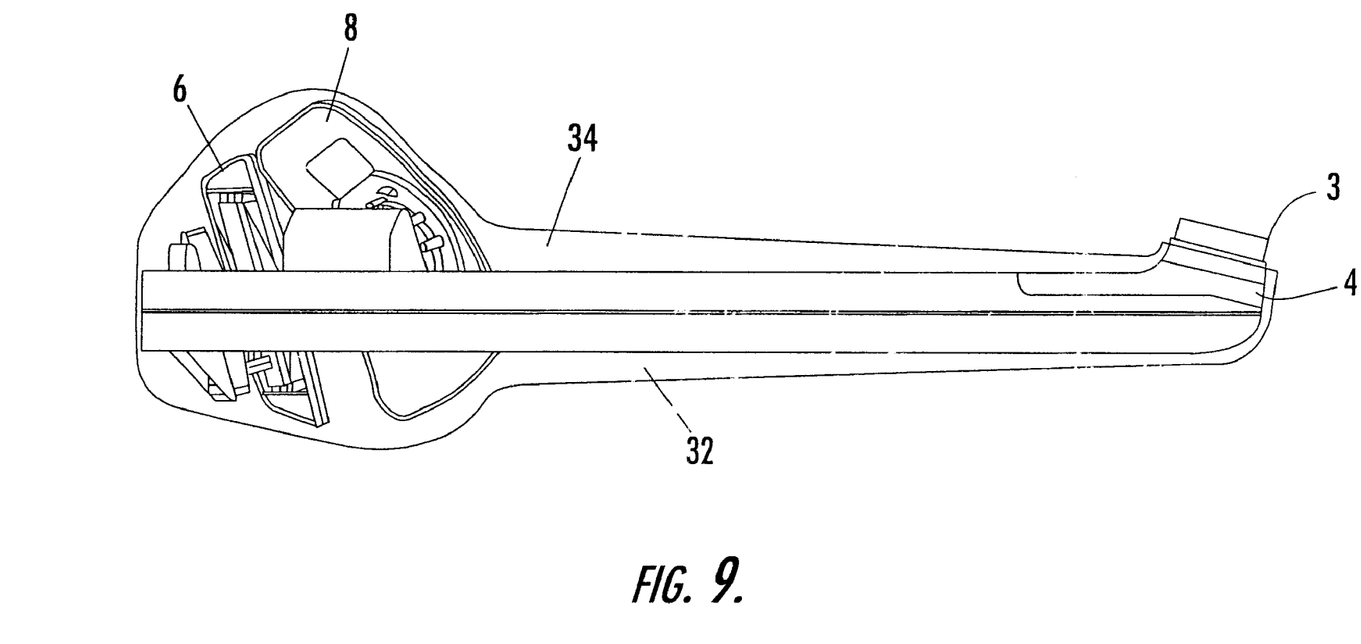

FIG. 5 shows the mirror arrangement without the encapsulating foam. FIG. 6 depicts the arrangement of FIG. 5 from above. FIG. 7 provides details of the said fitting 4. FIG. 8 exhibits a honeycomb framing 30, which can be used as an alternate to the branched compartmentalized framing 14. FIG. 9 depicts in schematic fashion, how the honeycomb framing 30 is embedded in a foamed component comprised of two half shells 32 and 34.

List of Reference Numbers

2 Carrier
4 Fitting
6 First mirror
8 Second mirror
10 Adjustment mechanism for first mirror
12 Adjustment mechanism for second mirror
14 Compartmentalized structure
16 Foamed component
17 Electrical connections
18 Retainer for first mirror
20 Retainer for second mirror
22 Pivotable linkage
24 First carrier arm
26 Second carrier arm
28 First linkage part
29 Second linkage part
30 Honeycomb structure
32 First half shell of rigid foam
34 Second half shell of rigid foam

What is claimed is:

1. A rearview mirror supporting assembly for a vehicle comprising:
    at least one exterior mirror disposed in a field of view of a driver; and
    an elongated carrier having a stiffening frame and a foam element, the stiffening frame and the foam element cooperating to form the carrier such that the carrier defines a first proximal end and a first distal end extending from the first proximal end, the carrier configured to attachably receive the at least one exterior mirror spaced substantially toward the first distal end, the stiffening frame having a second proximal end securable to an exterior part of the vehicle and a second distal end extending from the second proximal end, the first and second proximal ends disposed proximate each other, the first and second distal ends disposed proximate each other, the foam element in encapsulating, stiffening communication with the stiffening frame such that the stiffening frame is substantially embedded within the foam element.

2. The rearview mirror supporting assembly as in claim 1, wherein the frame is a compartmentalized structure having a base extending from the proximal end to the distal end of the frame.

3. The rearview mirror supporting assembly as in claim 2, wherein the compartmentalized structure includes a plurality of walls extending from the base to form a plurality of structural shapes disposed adjacent each other.

4. The rearview mirror supporting assembly as in claim 3, wherein at least some of the structural shapes are square in cross-section.

5. The rearview mirror supporting assembly as in claim 1, further comprising an adjustment mechanism, the adjustment mechanism attached to the carrier and the at least one exterior mirror attached to the mechanism.

6. The rearview mirror supporting assembly as in claim 1, further comprising a linkage to adjust the supporting assembly relative to the vehicle.

7. The rearview mirror supporting assembly as in claim 6, wherein the linkage is a remotely controlled, pivoting linkage to pivotally adjust the supporting assembly relative to the vehicle.

8. The rearview mirror supporting assembly as in claim 1, wherein the foam element is gradient foam.

9. The rearview mirror supporting assembly as in claim 1, wherein the frame comprises a plate having a plurality of perforations.

10. The rearview mirror supporting assembly as in claim 1, wherein the frame has a rough surface, the rough surface encapsulated by the foam element to provide additional stiffening.

11. The rearview mirror supporting assembly as in claim 1, wherein the frame has a protruding tab, the tab encapsulated by the foam element to provide additional stiffening.

12. The rearview mirror supporting assembly as in claim 1, further comprising a fitting attached to the proximal end of the frame, the fitting securable to the vehicle.

13. The rearview mirror supporting assembly as in claim 1, wherein the frame includes a honeycomb structure.

14. The rearview mirror supporting assembly as in claim 13, wherein the honeycomb structure has a plurality of perforations such that the foam element can permeate the honeycomb structure.

15. A rearview mirror supporting assembly for a vehicle comprising:
- a carrier having a first proximal end, a first distal end extending from the first proximal end, a stiffening honeycomb structure and a foam element, the honeycomb structure having a second proximal end securable to an exterior part of the vehicle and a second distal end extending from the second proximal end, the foam element in encapsulating, stiffening communication with the honeycomb structure such that the honeycomb structure is embedded within the foam element, the honeycomb structure and the foam element cooperating to provide stiffening of the rearview mirror supporting assembly; and
- a mirror assembly spaced substantially away from the first proximal end in a direction of the first distal end and attached to the carrier.

16. The rearview mirror supporting assembly as in claim 15, wherein the foam element is at least two half shells of gradient foam encapsulating the structure.

17. The rearview mirror supporting assembly as in claim 15, wherein the mirror assembly includes at least one rearview mirror.

18. The rearview mirror supporting assembly as in claim 15, further comprising an electrically driven, pivoting linkage to adjust the supporting assembly relative to the vehicle.

19. The rearview mirror supporting assembly as in claim 15, wherein the mirror assembly has an adjustment mechanism, the adjustment mechanism attached to the carrier and the at least one rearview mirror adjustably attached to the mechanism.

20. The rearview mirror supporting assembly as in claim 15, wherein the honeycomb structure has a plurality of perforations such that the foam element can permeate the honeycomb structure.

21. The rearview mirror supporting assembly as in claim 15, wherein the honeycomb structure has a rough surface configured to be encapsulated by the foam element to provide additional stiffening.

22. The rearview mirror supporting assembly as in claim 15, wherein the honeycomb structure has a protruding tab configured to be encapsulated by the foam element to provide additional stiffening.

23. The rearview mirror supporting assembly as in claim 15, wherein the foam element is gradient foam.

24. The rearview mirror supporting assembly as in claim 15, further comprising a fitting attached to the proximal end of the honeycomb structure, the fitting securable to the vehicle.

25. A rearview mirror supporting assembly for a vehicle comprising:
- at least one carrier arm having a honeycomb structure, the at least one carrier arm having an opening therethrough, the opening configured to receive an electrical connection, the honeycomb structure having a proximal end securable to an exterior part of the vehicle and a distal end extending from the proximal end;
- at least one other carrier arm having a linking end and an opposing end;
- linking means for linking the at least one carrier arm and the at least one other carrier arm, the linking means for linking configured to pivotally adjust the at least one carrier arm and the at least one other carrier arm;
- a foam element in encapsulating, stiffening communication with the honeycomb structure, the honeycomb structure substantially embedded within the foam element;
- a mirror adjustably attached to at least one of the at least one carrier arm and the at least one other carrier arm, the mirror spaced substantially apart from the proximal end in a direction of the distal and opposing ends.

26. The rearview mirror supporting assembly as in claim 25, further comprising a mounting assembly having a fitting and a mounting element, the fitting attachable to the proximal end and the mounting element attachable to the fitting, the mounting element configured to be securable to the vehicle.

\* \* \* \* \*